June 30, 1925.
J. LIEBL
SPRING SEAT SUPPORT
Filed June 21, 1924
1,544,248
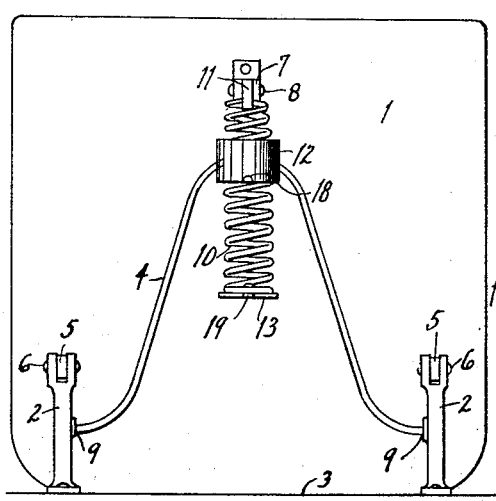
FIG. 1.
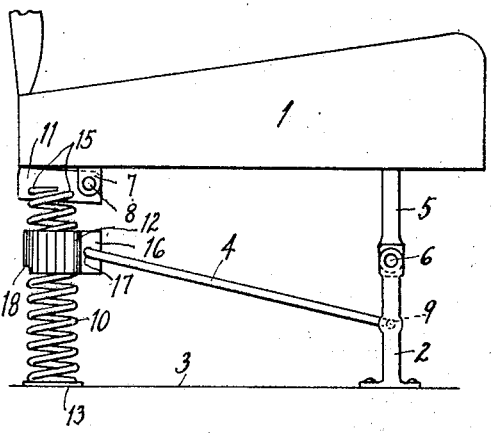
FIG. 2.
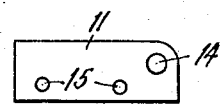
FIG. 3.
FIG. 6.
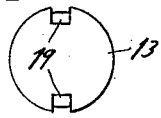
FIG. 5.
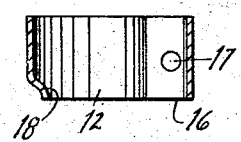
FIG. 4.
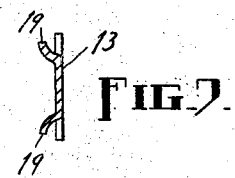
FIG. 7.
Joseph Liebl, INVENTOR.
BY
Frank A. Cutier, ATTORNEY.

Patented June 30, 1925.

1,544,248

UNITED STATES PATENT OFFICE.

JOSEPH LIEBL, OF WEST HATFIELD, MASSACHUSETTS, ASSIGNOR OF ONE-HALF TO HUGH McLEOD, OF HATFIELD, MASSACHUSETTS.

SPRING SEAT SUPPORT.

Application filed June 21, 1924. Serial No. 721,396.

*To all whom it may concern:*

Be it known that I, JOSEPH LIEBL, a citizen of the United States of America, and a resident of West Hatfield, in the county of Hampshire and State of Massachusetts, have invented a new and useful Spring Seat Support, of which the following is a specification.

My invention relates to improvements in means of a resilient nature to support in part a folding or tilting seat, when the same is disposed in operative position, and consists essentially of a spring provided with a head block which is adapted to be pivotally connected with a tilting or pivotally-connected seat, and a sleeve adjustable on said spring and pivotally connected with a movable brace, together with such seat and brace, and such other parts and members as may be necessary or desirable in order to render the device or support complete and serviceable in every respect, all as hereinafter set forth.

One object of my invention is to produce a comparatively simple and inexpensive, yet strong and durable, and convenient and efficient, yielding support for a seat, which latter is pivotally connected with the floor or other fixed part of an automobile in such a way that the same can be turned up out of the way when not in use.

Another object is to provide a device of this character that is especially adapted for use with the right-hand folding or tilting seat in a Ford sedan, such device taking the place of the pivotally-connected leg with which such seat is ordinarily provided. This device or spring seat support can be substituted for the aforesaid leg without the addition of new parts or members, other than the support itself, and the change from one to the other can be effected easily and quickly and without the exercise of any particular degree of skill.

A further object is to furnish the device with adjustable means whereby the same can be made to assume a vertical or approximately vertical position, when operatively disposed beneath the seat in its normal position, or whereby said device might otherwise be positioned operatively if desired.

Other objects and advantages will appear in the course of the following description.

I attain the objects and secure the advantages of my invention by the means illustrated in the accompanying drawings, in which—

Figure 1 is a rear elevation of a tilting seat equipped with a practical form of my spring support therefor, said seat being turned up with said support and the brace therefor folded against the bottom of said seat; Fig. 2, a side elevation of said seat and support, both being disposed in operative positions; Fig. 3, an enlarged side elevation of the block or head at the upper end of the spring of the support; Fig. 4, an enlarged vertical section through the sleeve of the support; Fig. 5, an enlarged top plan of said sleeve; Fig. 6, an enlarged bottom plan of the base plate for said spring, and, Fig. 7, a section through said plate.

Similar reference characters designate similar parts throughout the several views.

In the first two views a seat is represented at 1, supporting posts at 2—2, such posts rising from the floor, as 3, of a vehicle, and an oscillatory, swinging, or movable, U-shaped brace 4. Brackets 5—5 are secured to the under side of the seat 1 adjacent to the front edge thereof, and such brackets are pivotally connected at 6—6 with the upper terminals of the posts 2. Thus it is seen that the seat 1 can be rocked on the posts 2 to dispose the same in either an approximately horizontal or vertical position. On the bottom of the seat 1 adjacent to the center of the front edge thereof is a bracket 7 which is provided with a pivot 8. The brace 4 has its terminals bent outwardly, and such terminals are received in suitable openings provided for that purpose in the inner adjacent sides of the posts 2 below the pivots 6, as indicated at 9—9.

The parts and members thus far described are old, well known, and in common use, and heretofore have had associated and connected therewith a rigid leg to support the rear portion of the seat 1, when the latter is rocked downwardly on the pivots 6 into an approximately horizontal position. The present device is substituted for the aforesaid leg, and such device will now be explained.

The spring seat support comprises a spiral spring 10, a head block or head 11, a sleeve 12, and a base plate 13. The length or height of the support is about the same as that of the leg which is supplanted by said support. The spring 10 is of a size and strength most suitable for supporting or assisting in supporting the weight of a heavy person sitting on the seat 1, without being so stiff as to be unyielding under the weight of a person who is comparatively light in weight.

The block or head 11 has an opening 14 therein adjacent to the upper front corner thereof to receive the pivot 8, and two openings 15 therein, one behind the other, to receive the upper convolution of the spring 6, which convolution is passed through said openings 15. Thus the head and spring are securely fastened together with the former standing edgewise.

The sleeve 12 encircles the spring 6, and has its terminals extended and bent to form a hollow lug 16. In each side of the lug 16 is an opening 17 to receive the brace 4. The lug 16 is on the front side of the sleeve 12, when said sleeve is properly disposed on the spring 10. The sleeve 12 is provided with an inwardly directed member 18 which enters between the convolutions of the spring 10 and serves as a guide, whereby said sleeve is caused to move up or down on said spring when the sleeve is rotated and according to the direction of rotation. The member 18 may be in the form of a lug struck out of the sleeve 12, as in the present example, where such lug consists of a portion of the wall of said sleeve which is forced inwardly at the bottom.

Provision for adjustment of the sleeve 12 on the spring 10 is needed in order that the parts may be so corelated as to cause the support to be made to assume an approximately vertical position when swung rearwardly by the brace 4, at the time the seat 1 is turned down into operative or supporting position, and the more so because such brace in one automobile may differ somewhat in length or shape from that in another automobile.

The base plate 13 is merely a disc of sheet-metal of a diameter sufficient in size to receive thereon the base of the spring 10, and prevent such base from coming into direct contact with the floor when the support is in use. The plate 13 may be secured to the spring 10 by any suitable means, but I prefer to strike out of said plate two or more lugs or ears, as 19, which ears engage the upper part of the bottom convolution of the spring 10, and thus hold said plate tightly in place against the under side of said convolution.

In order to replace the leg, with which the seat 1 is initially equipped, with my support, it is simply necessary to remove the pivot 8 from the bracket 7 and thus release such leg from said bracket, to force toward each other the arms of the brace 4 and thereby withdraw the terminals of said brace from the posts 2, and to remove said brace from such leg, and then to pass the brace through the openings 17 in the lug 16 on the sleeve 12, until the intermediate portion of the brace is in engagement with said lug, to place the head 11 between the ears of the bracket 7 and replace said pivot in said bracket, passing the pivot through the opening 14 in said head, and finally to reengage said terminals of the brace with said posts. The spring support is now attached to and operatively connected with the seat 1 in practically the same manner as was the leg which has been removed.

In practice, when the seat 1 is rocked downwardly on the pivots 6 into an approximately horizontal position, the brace 4 is caused to swing downwardly, rocking in the posts 2, by the descending sleeve 12 on the spring 10, which latter depends from the head 11, and said brace in turn swings the support outwardly until the same assumes an approximately vertical position. By this time the base plate 13 comes to rest on the floor 3 and the seat 1 assumes an approximately horizontal position. The seat 1 is now supported in front by the brackets 5 and the posts 2, and behind by the head 11, spring 10, and plate 13—see Fig. 2. The brace 4, acting through the sleeve 12, prevents the spring 10 from slipping forwardly or rearwardly at the bottom, and thus holds the same in proper position.

It will now be seen that the spring 6 must contract and expand more or less under the weight of a person on the seat 1, and as the automobile vibrates in its passage over the road, said seat rocking on the pivots 6 with the result that the greater portion of the shock and jar, to which such person would ordinarily be subjected, is eliminated by being absorbed by said spring.

When the spring support is in operative position, the bottom of the seat 1 adjacent to the rear edge thereof bears directly on the upper edge of the head 11 adjacent to its outer end.

If it be found that the support is not properly positioned by the brace 4, when said support is resting on the floor 3, said brace is disengaged from the posts 2 and the sleeve 12 is adjusted to whatever extent may be required, by screwing the same either up or down on the spring 10, as may be necessary, in order to obtain the desired result, and then said brace is reengaged with said posts.

Upon rocking the seat 1 upwardly on the pivot 6 into an approximately vertical position, or until the front edge of said seat comes to rest on the floor 3, the brace 4 is caused to be swung upwardly and to swing the spring support toward the bottom side of said seat, until the lug 16 contacts with such side, said support swinging on the pivot 8. The parts and members are now disposed as shown in the first view.

The diameter of the sleeve 12 should be enough larger than that of the spring 10 to enable said spring to expand when the same is compressed. In other words, the sleeve should have a fairly loose fit in the spring.

More or less change in the shape, size, construction, and arrangement of some or all of the parts of this device may be made, without departing from the spirit of my invention or exceeding the scope of what is claimed.

What I claim as my invention, and desire to secure by Letters Patent, is—

1. As an improved article of manufacture, a spring seat support comprising a spring having a head adapted to be pivotally connected with a seat, and a sleeve on said spring, which sleeve is adapted to be connected with a movable brace.

2. As an improved article of manufacture, a spring seat support comprising a spring having a head adapted to be pivotally connected with a seat, and also having a base plate, and a sleeve on said spring, which sleeve is adapted to be connected with a movable brace.

3. As an improved article of manufacture, a spring seat support comprising a spring having a head adapted to be pivotally connected with a seat, and a sleeve on said spring, said sleeve having a part to engage said spring, whereby the sleeve when rotated is caused to move up or down on the spring, the former being adapted to be connected with a movable brace.

4. As an improved article of manufacture, a spring seat support comprising a spring, a head perforated to receive the upper convolution of said spring, and further perforated to receive a pivot, and a sleeve on said spring, which sleeve is adapted to be connected with a movable brace.

5. As an improved article of manufacture, a spring seat support comprising a spring having a head adapted to be pivotally connected with a seat, and a sleeve on said spring, said sleeve having a perforated lug adapted to receive a movable brace.

6. As an improved article of manufacture, a spring seat support comprising a spring having a head adapted to be pivotally connected with a seat, and a sleeve on said spring, said sleeve having a perforated lug adapted to receive a movable brace, and also having an inwardly directed member to enter between the convolutions of said spring and cause said sleeve when rotated to move up or down on said spring.

7. As an improved article of manufacture, a spring seat support comprising a spring, a head perforated to receive the upper convolution of said spring, and further perforated to receive a pivot, a sleeve on said spring, said sleeve having a perforated lug to receive a movable brace, and also having an inwardly directed member to enter between the convolutions of and cause said sleeve to move up or down on said spring, when the sleeve is rotated, and a plate having ears to engage the bottom convolution of said spring and retain said plate in place beneath the same.

JOSEPH LIEBL.

Witnesses:
 FRANCIS W. LOVETT,
 MALCOLM CRAWFORD.